United States Patent [19]

Burke

[11] 4,185,146

[45] Jan. 22, 1980

[54] POLYURETHANE BINDER COMPOSITION CONTAINING A RUBBER EXTENDER OIL AND A FINELY DIVIDED SOLID SOYBEAN DERIVATIVE

[75] Inventor: Earl S. Burke, Newport Beach, Calif.

[73] Assignee: The General Tire & Rubber Company, Akron, Ohio

[21] Appl. No.: 960,899

[22] Filed: Nov. 15, 1978

[51] Int. Cl.$^2$ ............................................. C08L 75/08
[52] U.S. Cl. ........................................ 521/99; 260/13; 260/18 TN; 260/33.6 UB; 260/37 N; 521/102; 521/137; 521/151; 528/48
[58] Field of Search ................. 521/102, 151, 137, 99; 260/18 TN, 33.6 UB, 13, 37 N; 528/48

[56] References Cited

U.S. PATENT DOCUMENTS

| | | | |
|---|---|---|---|
| 2,636,889 | 4/1953 | Jones et al. ............................. | 528/80 |
| 2,833,730 | 5/1958 | Barthel ................................... | 528/65 |
| 2,888,412 | 5/1959 | Bender .................................... | 528/65 |
| 3,332,896 | 7/1967 | Burns et al. ............................ | 528/65 |
| 3,485,779 | 12/1969 | Gast et al. ........................ | 260/18 TN |
| 3,594,184 | 7/1971 | Hawley et al. ......................... | 99/98 |
| 3,846,355 | 11/1974 | Mayer .................................... | 528/48 |
| 3,931,071 | 1/1976 | Trecker et al. ................. | 204/159.14 |
| 3,933,705 | 1/1976 | Olstowski ............................. | 528/48 |
| 3,966,702 | 6/1976 | Carey .................................... | 426/422 |

Primary Examiner—Maurice J. Welsh

[57] ABSTRACT

A composition suitable for use as a binder for shredded, flexible polyurethane foams to make articles such as carpet or rug underlay comprises a polyalkylene ether polyol having from 2–4 hydroxyl groups, a minor amount by weight of a rubber extender oil, a stoichiometric excess of a certain diisocyanate and a minor amount by weight of a finely divided, solid soybean derivative.

5 Claims, No Drawings

POLYURETHANE BINDER COMPOSITION CONTAINING A RUBBER EXTENDER OIL AND A FINELY DIVIDED SOLID SOYBEAN DERIVATIVE

This invention relates to a polyurethane binder composition containing a minor amount by weight of a finely divided soybean derivative and which composition is useful for binding shredded polyurethane foam to make polyurethane foam carpet or rug underlay.

BACKGROUND OF THE INVENTION

It is known to recover scrap polyurethane foam by heating it in the form of particles in admixture with an aliphatic diol having from 2 to 6 carbon atoms and recovering a homogeneous mixture of polyols (U.S. Pat. No. 3,983,087). Scrap polyurethane foam particles, also, may be rebonded together by mixing them with a polyurethane prepolymer having a free NCO content of from about 2 to 20 percent and made from certain aromatic diisocyanates and a polyethylene ether polyol or a polyethylene ether propylene ether polyol having a polyoxyethylene content of from about 30 to 100 percent, compressing the mixture and curing the same (U.S. Pat. No. 4,082,703).

Crude soybean lecithin has been reacted with an organic diisocyanate to form a product which is readily dispersible and does not undergo fermentation (U.S. Pat. No. 2,636,889). Castor oil and blown oils including soya oil, an arylene diisocyanate, glycerine and water have been reacted together preferably in the presence of a tertiary amine catalyst to form a cellular plastic (U.S. Pat. No. 2,833,730). Flexible elastomeric cellular materials have been made from polyols like polyethers, polyesters and polyesteramides, castor oil, water and an organic diisocyanate (U.S. Pat. No. 2,888,412). Coating compositions have been made from polyisocyanates and the alcoholysis product of a drying oil like soybean oil or a dehydrated castor oil and a polyether polyol such as the propylene oxide adduct of sorbitol (U.S. Pat. No. 3,332,896). Baked urethane modified polyesteramide coatings exhibiting improved resistance to dilute alkali have been produced by reacting a diisocyanate with the hydroxyl-terminated polyester amide resulting from refluxing particular dicarboxylic compounds with a slight excess of N,N,-bis(2-hydroxyethyl) soybean amide or corresponding linseed amide (U.S. Pat. No. 3,485,779). Epoxidized soybean oil can be treated with acrylic acid and be further treated with acrylates, amines or isocyanates to provide coatings on substrates which can be cured by irradiation (U.S. Pat. No. 3,931,071).

OBJECTS

An object of the present invention is to produce a polyurethane binder composition suitable for binding shredded polyurethane foam to make carpet or rug underlay wherein a reduction may be made in the polyisocyanate and/or polyol content of the binder with achievement of satisfactory results or where the binder may be extended with achievement of satisfactory results.

A further object is to provide a polyurethane foam product comprised of shredded polyurethane foam particles bound together by a novel polyurethane binder composition.

These and other objects and advantages of the present invention will become more apparent to those skilled in the art from the following detailed description.

STATEMENT OF THE INVENTION

A composition suitable for use as a binder for shredded flexible polyurethane foam in making articles like carpet or rug underlay comprises a polyalkylene ether polyol having from 2 to 4 hydroxyl groups, a minor amount by weight of a rubber extender oil, a stoichiometric excess of a diisocyanate over that required to react with all of the active hydrogen atoms of the polyol, and a minor amount by weight of a finely divided, solid soybean derivative. The use of the soybean derivative enables the obtainment of a carpet or rug underlay exhibiting the same or essentially the same properties as one without the soybean derivative but using less expensive diisocyanate and/or polyol, thus achieving a decrease in binder cost or usage.

DISCUSSION OF DETAILS AND PREFERRED EMBODIMENTS

Methods for treating soybeans and their hulls and so forth to produce finely divided solid derivatives or materials such as particles, flours and so forth are known as shown by U.S. Pat. Nos. 3,561,515; 3,594,184; 3,594,185; 3,594,186; 3,598,610 and 3,966,702. A useful material, which is commercially available and known as "Poly-Soy" (Ralston Purina Company), is described as an extender for various resin systems most commonly PVC and reinforced polyesters and consists of both a proteinaceous and cellulosic fraction containing numerous—OH groups as well as reactive pendant protein groups (—COOH,—OR and —$NH_2$). It is stated to have a large surface to mass ratio and to show good structural geometry exhibiting elongated hexagonal polygons representing the cell walls of the soybean cotyledon from which solubles have been removed. It is said to have a particle size of from about −100 to +60 mesh, flour or grit. It is said to have the following typical analysis:

| | |
|---|---|
| % Moisture | 6 |
| % Protein | 25 |
| % Fat | 2 |
| % Fiber | 38 |
| % Cellulose | 65 |
| % Ash | 5 |
| % Calcium | 1.2 |
| % Phosphorus | 0.7 |
| pH | 8–9 |
| Bulk Density (Flour) | 25–30 lb/ft$^3$ |
| Specific Gravity (Flour) | 1.4–1.5 gm/cm$^3$ |
| Color | light tan |
| Sorptive Properties Water | 4–5 times its own weight |
| Organic Liquids | 0.5–2 times its own weight |

The soybean derivative is used in an amount of from about 7.5 to 25 parts by weight per 100 parts by weight of the polyalkylene ether polyol.

The polyalkylene ether polyols usable in this invention have from 2 to 4 hydroxyl groups and an average molecular weight of from about 2,000 to 4,500, preferably of from about 3,000 to 3,500. In the commercially available polyols of this type from about 5 to 85% of the total hydroxyl end groups usually are primarily hydroxyl groups (by end-capping with ethylene oxide). The polyalkylene ether polyols are well known in the urethane art and are generally made by reacting a polyhydric alcohol or polyamine with an alkylene oxide in the presence of a catalyst. Examples of polyhydric alcohols and so forth are ethylene glycol, pentaerythritol, propylene glycol, 2,3-butylene glycol, 1,3-butylene glycol, 1,5-pentanediol, 1,6-hexanediol, glycerol, trimethylol propane, hexanetriol, ethylene diamine and so forth. Suitable alkylene oxides include ethylene oxide, propylene oxide, butylene oxide, amylene oxide and mixtures of the same. Other polyetherpolyols well known in the art can be included or substituted in the systems of this invention. Mixtures of polyalkylene ether polyols can be used. The preferred polyalkylene ether polyols used in this invention are polypropylene ether triols or polypropylene ether triols containing a major amount of propylene oxide moities the remaining moities being from ethylene oxide, butylene oxide, amylene oxide and so forth and mixture thereof. If ethylene oxide is a comonomer or used for end-capping it should not be used in an amount of more than about 25 wt. % to prevent water sensitivity.

The diisocyanate employed in the binder composition should be used in an amount by weight sufficient to provide an excess of the stoichiometric amount of —NCO groups required to react with all of the active hydrogen atoms or groups (as determined by the Zerewitinoff method, J.A.C.S., Vol. 49, p. 3181 (1927) e.g., hydroxyl groups, of the polyalkylene ether polyol. Examples of useful diisocyanates or mixtures thereof to employ are 2,4-tolylene diisocyanate (TDI), 2,6-tolylene diisocyanate (TDI), 4,4'-diphenyl methane diisocyanate (MDI), hydrogenated 4,4'-diphenyl methane diisocyanate (or 4,4'-dicyclohexyl methane diisocyanate), polymeric forms of TDI, MDI and hydrogenated MDI, xylene diisocyanate, isophorone diisocyanate and hexamethylene diisocyanate. Of these diisocyanates it is preferred to use 2,4- or 2,6-tolylene diisocyanate or mixture of these tolylene diisocyanates.

The oils to be used are rubber compounding processing or extender oils which also may be considered sometimes as plasticizers or softeners. These processing oils may be of the aromatic including highly aromatic, naphthenic (preferred) or paraffinic type or mixture thereof. The processing oils preferably should be nonstaining, be light colored or clear where light colored products are desired, and have low volatility. The pour point of the processing oils should be below about 30° C. These processing oils should have a viscosity SUS (Saybolt Universal viscosity seconds) at about 38° C. of from about 40 to 27,000 preferably from about 40 to 7,000 and a molecular weight of from about 220 to 2,400, preferably from about 220 to 720. The molecular type analysis of these processing oils, clay-gel weight, should be from about 0. to 0.1% asphaltenes, from about 0.2-18% polar compounds, from about 10 to 80% aromatic compounds, and from about 10 to 90% of saturates. It is well known that the polar compounds are designated as such since their hydrocarbon molecules may contain nitrogen, oxygen and/or sulfur atoms. The carbon type analyses of these processing oils show that they contain from about 3 to 47% aromatic carbon atoms ($C_A$), from about 19 to 44% naphthenic carbon atoms ($C_N$), and from about 31 to 73% paraffinic carbon atoms ($C_P$). Processing or extending oils used in rubber compounding are well known. See "Plasticizer Technology," Vol. 1, Bruins, 1965, Reinhold Publishing Corporation, New York; "India Rubber World," Vol. 126, No. 4, July 1952, pages 495–499; "Industrial And Engineering Chemistry," May, 1953, pages 1035–1053; ASTM Specification D 2226-70; Sun Oil Company, Industrial Products Department, Technical Bulletin No. 88, "Rubber Process & Extender Oils," 12 pages; "Petroleum Oils For The Chemical Process Industry," Sun Oil Company, Bulletin No. A1-1006, Copyright 1976, 8 pages; and "Materials, Compoundng Ingredients, And Machinery For Rubber," 1977, Bill Communications, Inc., New York. The oil is used in an amount of from about 30 to 50 parts by weight per 100 parts by weight of the polyalkylene ether glycol.

Other additives may be added to the binder composition such as color pigments like phthalocyanine blue or green, antidegradants, urethane catalysts like the tertiary amines or tin catalysts like dibutyl tin dilaurate, tin octoate or tin oleate, UV absorbers and so forth. Well-known urethane crosslinking materials, also, may be used such as glycerol, trimethylol propane, hexane triol, pentaerythritol, sorbitol, ethylene diamine and so forth.

While the binder composition of this invention has been described as useful in making carpet underlay, it, also, can be used in the manufacture of upholstery, toys, interliners for clothing, wiping sponges and other fabricated flexible polyurethane articles.

In forming a rebonded urethane foams the polyurethane foam, generally scrap, is comminuted or shredded (chopped, ground, etc.) into relatively small particles in conventional apparatus such as a grinder. The particle size of the shredded foam is not critical and will vary depending upon the type of grinding used. Uniformity of particle size is not needed, and a typical shredded foam may contain particles smaller than 1/16 of an inch or smaller up to particles having at least one dimension perhaps 2 inches or more. The shredded foam may also contain in commercial practice minor amounts of a wide variety of other scrap materials ranging from, for example, string to polyethylene film.

The shredded foam is then transported to a mixing container such as a ribbon blender or blending trough; and, while the foam particles are being agitated, such as by means of air in the trough or tank, the binder ingredients are added, typically by spraying and thoroughly blended or mixed together. All of the ingredients may be mixed together at once and sprayed onto the shredded polyurethane particles. Alternatively, the diisocyanate and polyol may first be prereacted to form an isocyanate terminated polyurethane prepolymer and then mixed with the oil and solid, finely divided soybean derivative and then added. The mixture of binder and foam particles is then cast in a mold or other apparatus or compressed to form a log. After curing with steam or by other means to the state where it can be handled, the log is removed from the apparatus and is peeled to form a long continuous rebonded layer or sheet, e.g., a flexible polyurethane foam carpet or rug underlay. Shredded foam includes also chopped, comminuted or otherwise cut-up or small particles of foam. The binder composition of this invention is used in a minor amount by weight sufficient to bind the shredded polyurethane foam particles together on curing to form a bound or adherent unitary mass capable of being peeled or veneered to form a load supporting cushioning carpet or rug underlay. In general, there can be used from about 3 to 15 parts by weight of the binder composition per 100 parts by weight of the shredded flexible polyurethane foam particles. The polyurethane foam particles may be obtained from flexible polyether urethane foams, polyesterurethane foam or polyether ester urethane foams or mixtures of the same, preferably from polyetherurethane foams.

Some binder formulae with and without the soybean derivative for use with shredded flexible polyurethane foam for making carpet or rug underlay are as follows:

| Material | Parts by Weight | Parts by Weight | Parts by Weight |
|---|---|---|---|
| Polypropylene ether triol, mw about 3,000 | 57.2 | 52.2 | 50.32 |
| 80/20, 2,4-/2,6-tolylene diisocyanate | 23.0 | 21.3 | 20.55 |
| Rubber extender oil, naphthenic, "Circosol," Sun Oil Co. | 19.8 | 20.8 | 20.04 |
| "Poly-Soy" flour | — | 5.7 | 9.09 |

I claim:

1. A composition of matter useful as a binder and comprising
   (a) 100 parts by weight of a polyalkylene ether polyol having from 2 to 4 hydroxyl groups and an average molecular weight of from about 2,000 to 4,500,
   (b) from about 30 to 50 parts by weight of a rubber extender oil,
   (c) from about 7.5 to 25 parts by weight of a finely divided, solid soybean derivative consisting of both a proteinaceous and cellulosic fraction containing numerous —OH groups as well as reactive pendant protein groups (—COOH, —OR and —NH$_2$), having a large surface to mass ratio and showing good structural geometry exhibiting elongated hexagonal polygons representing the cell walls of the soybean cotyledon from which solubles have been removed, and
   (d) a diisocyanate in an amount in excess of the stoichiometric amount required to react with all of the active hydrogen atoms of the polyol, and diisocyanate being selected from the group consisting of 2,4-tolylene diisocyanate, 2,6-tolylene diisocyanate, 4,4'-diphenyl methane diisocyanate, hydrogenated 4,4'-diphenyl methane diisocyanate, polymeric forms of TDI, MDI and hydrogenated MDI, xylene diisocyanate, isophorone diisocyanate and hexamethylene diisocyanate and mixtures of the same.

2. A composition according to claim 1 wherein
   (a) is polypropylene ether triol having a molecular weight of from about 3,000 to 3,500,
   (b) is a naphthenic oil and
   (d) is 2,4-tolylene diisocyanate or 2,6-tolylene diisocyanate or mixture thereof.

3. A composite cured article comprising shredded flexible polyurethane foam particles bonded together by means of a minor amount by weight as compared to said particles of binder composition comprising
   (a) 100 parts by weight of a polyalkylene ether polyol having from 2 to 4 hydroxyl groups and an average molecular weight of from about 2,000 to 4,500,
   (b) from about 30 to 50 parts by weight of a rubber extender oil,
   (c) from about 7.5 to 25 parts by weight of a finely divided, solid soybean derivative consisting of both a proteinaceous and cellulosic fraction containing numerous —OH groups as well as reactive pendant protein groups (—COOH, —OR and —NH$_2$), having a large surface to mass ratio and showing good structural geometry exhibiting elongated hexagonal polygons representing the cell walls of the soybean cotyledon from which solubles have been removed, and
   (d) a diisocyanate in an amount in excess of the stoichiometric amount required to react with all of the active hydrogen atoms of the polyol, said diisocyanate being selected from the group consisting of 2,4'-tolylene diisocyanate, 2,6-tolylene diisocyanate, 4,4'-diphenyl methane diisocyanate, hydrogenated 4,4'-diphenyl methane diisocyanate, polymeric forms of TDI, MDI and hydrogenated MDI, xylene diisocyanate, isophorone diisocyanate and hexamethylene diisocyanate and mixtures of the same.

4. An article according to claim 3 wherein in said binder composition
   (a) is polypropylene ether triol having a molecular weight of from about 3,000 to 3,500,
   (b) is a naphthenic oil and
   (d) is 2,4-tolylene diisocyanate or 2,6-tolylene diisocyanate or mixture thereof, wherein said polyurethane foam is a polyetherurethane foam and wherein said binder composition is used in an amount of from about 3 to 15 parts by weight per 100 parts by weight of said shredded flexible polyurethane foam particles.

5. An article according to claim 3 in the form of a carpet or rug underlay.

* * * * *